(12) United States Patent
Rey

(10) Patent No.: US 12,187,001 B2
(45) Date of Patent: Jan. 7, 2025

(54) METHOD OF MOLDING A CONTAINER INTO A TIRE

(71) Applicant: Compagnie Generale des Etablissements Michelin, Clermont-Ferrand (FR)

(72) Inventor: Daniel Rey, Belton, SC (US)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 337 days.

(21) Appl. No.: 17/637,536

(22) PCT Filed: Dec. 19, 2019

(86) PCT No.: PCT/US2019/067357
§ 371 (c)(1),
(2) Date: Feb. 23, 2022

(87) PCT Pub. No.: WO2021/126199
PCT Pub. Date: Jun. 24, 2021

(65) Prior Publication Data
US 2022/0281197 A1    Sep. 8, 2022

(51) Int. Cl.
*B29D 30/06*   (2006.01)
*B29D 30/00*   (2006.01)

(52) U.S. Cl.
CPC ...... *B29D 30/0654* (2013.01); *B29D 30/0061* (2013.01); *B29D 2030/0072* (2013.01); *B29D 2030/0655* (2013.01)

(58) Field of Classification Search
CPC ............ B29D 30/0061; B29D 30/0645; B29D 30/0654; B29D 30/0655;
(Continued)

(56) References Cited

U.S. PATENT DOCUMENTS

2008/0087368 A1*  4/2008  Nobuchika ........ B29D 30/0601
                                                       156/117
2009/0159215 A1*  6/2009  Agostini ............ B29D 30/0654
                                                       156/421.6
(Continued)

FOREIGN PATENT DOCUMENTS

DE    102007014211 A1    9/2008
EP        3549754 A1    10/2019
(Continued)

OTHER PUBLICATIONS

Sato H, JP-2017042957-A, machine translation. (Year: 2017).*
(Continued)

*Primary Examiner* — Sedef E Paquette
(74) *Attorney, Agent, or Firm* — Neal P. Pierotti

(57) ABSTRACT

A method of molding a tire that has a container (12) that includes the steps of placing an uncured tire into a mold, and providing a bladder (16) that has a flexible portion (18) and an insert (20) that has a cavity configured for molding the container into the tire. The bladder has a fluid therein and is inflated within the mold, and material of the uncured tire flows into the cavity of the insert (20). Sufficient heat and pressure is applied to the uncured tire to at least partially cure the tire when the uncured tire is in the mold. The material in the insert (20) forms the container (12) such that the container is integrally formed with other portions of the tire. The mold is opened to retrieve the tire.

14 Claims, 12 Drawing Sheets

(58) Field of Classification Search
CPC .... B29D 2030/0072; B29D 2030/0655; B29D 2030/0659; B29D 2030/0666; B60C 19/00; B60C 19/003; B60C 19/125; B60C 2019/004; B60C 2019/005; B60C 11/243
USPC ...................................................... 156/421.6
See application file for complete search history.

(56) References Cited

U.S. PATENT DOCUMENTS

| | | |
|---|---|---|
| 2015/0306831 A1 | 10/2015 | Joza et al. |
| 2017/0057304 A1 | 3/2017 | So et al. |
| 2017/0136832 A1 | 5/2017 | So et al. |
| 2017/0355235 A1* | 12/2017 | Wei .................... B60C 23/0493 |
| 2018/0361804 A1 | 12/2018 | Wei et al. |

FOREIGN PATENT DOCUMENTS

| | | | | |
|---|---|---|---|---|
| JP | 2015202575 A | * | 11/2015 | |
| JP | 2017042957 A | * | 3/2017 | |

OTHER PUBLICATIONS

Yamamura K, JP-2015202575-A, machine translation. (Year: 2015).*
European Patent Office, International Search Report dated Sep. 1, 2020, pp. 1 to 11 (included), European Patent Office, Rijswijk, Netherlands.

* cited by examiner

METHOD OF MOLDING A CONTAINER INTO A TIRE

CROSS-REFERENCE TO RELATED APPLICATIONS

The present application is a 35 U.S.C. § 371 application of PCT/US19/67357 filed on Dec. 19, 2019 and entitled "Method of Molding a Container Into a Tire." PCT/US19/67357 is incorporated by reference herein in its entirety for all purposes.

FIELD OF THE INVENTION

The present invention relates generally to a method of molding a tire that has a container in the tire that can be used to hold items such as a sensor. More particularly, the present application involves a method of molding a tire using a flexible bladder that carries an insert that can impart a container into the tire during the molding process.

BACKGROUND

It is known to place sensors into the tires of vehicles in order to measure such things as tire inflation pressure, tire temperature, tire acceleration, tire velocity, and other parameters. Such electronic sensors typically require a container to be fixed inside of the tire into which the sensor is disposed and retained. The container can have a cavity into which the electronic sensor is placed, and one known sensor container includes a lip that surrounds a portion of the top of an electronic sensor and holds it in place in the cavity. The lip is made of a flexible material and is peeled or inverted upward to allow the sensor to be pushed past it and into the cavity. The flexible lip can then be flipped back into its original position, and in so doing engage the sensor and function to retain it in the cavity. The holding of the electronic sensor within the tire should be strong enough to keep the electronic sensor in place upon being subjected to high acceleration, forces, and temperatures during operation of the vehicle.

The container can be a piece that is separately formed and then subsequently attached to the tire once the tire has been molded. This attachment can be made by using green rubber or adhesive to bond the rubber container to the inner layer of the tire. However, the subsequent attachment of a separate piece adds weight and additional processing steps to the overall production of the tire. Another way of providing a container to the interior of the tire is by molding it into the tire during the production process. This process results in the formation of a flap on the inner surface of the tire, and requires the positioning of additional separating components and the careful removal of such components once the molding is completed. The resulting flap/container is flat and has an aperture immediately adjacent the inner surface of the tire. Although capable of holding a flat sensor, such a manufacturing process cannot produce a flap/container capable of holding a non-flat shaped electronic sensor and limits the location and shape of the container.

A yet additional way of forming a container within a tire involves providing a solid core drum that has a cavity into which rubber flows during molding of the tire. A container formed by a solid core drum process may be capable of holding electronic sensors that are not of a flat shape. However, the use of a solid core in the production of tires with containers may require variously sized solid cores to be produced when manufacturing tires of different types and sizes. Although different techniques are known for producing tires that have containers for holding sensors, there remains room for variation and improvement within the art.

BRIEF DESCRIPTION OF THE DRAWINGS

A full and enabling disclosure of the present invention, including the best mode thereof, directed to one of ordinary skill in the art, is set forth more particularly in the remainder of the specification, which makes reference to the appended FIGS. in which.

Figure 1:
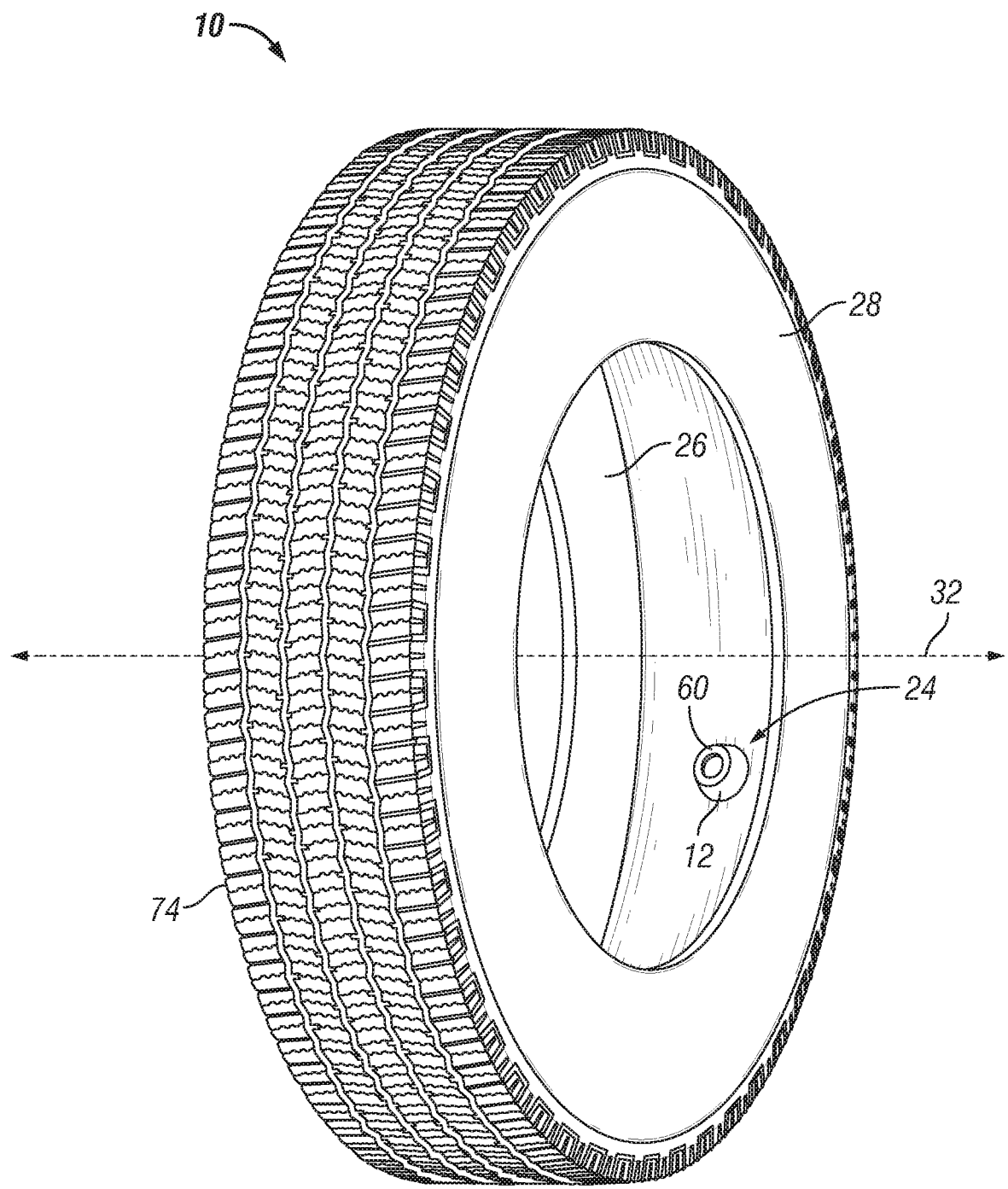
FIG. 1 is a perspective view of a tire that has a container.

Repeat use of reference characters in the present specification and drawings is intended to represent the same or analogous features or elements of the invention.

DETAILED DESCRIPTION OF REPRESENTATIVE EMBODIMENTS

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

It is to be understood that the ranges mentioned herein include all ranges located within the prescribed range. As such, all ranges mentioned herein include all sub-ranges included in the mentioned ranges. For instance, a range from 100-200 also includes ranges from 110-150, 170-190, and 153-162. Further, all limits mentioned herein include all other limits included in the mentioned limits. For instance, a limit of up to 7 also includes a limit of up to 5, up to 3, and up to 4.5.

A method of molding a container 12 into a tire 10 is provided that includes a bladder 16 that has an insert 20. The insert 20 is carried by a flexible portion 18 of the bladder 16 and is either a separate piece that is attached to the flexible portion 18 or is an integral component of the flexible portion 18. During the molding process, the flexible portion 18 is inflated and pressed against the inner surface 24 of the green tire 10. The insert 20 includes a cavity 22 into which rubber of the green tire 10 flows during the molding process. Once the tire 10 is cured to an extent, the mold 14 is opened and the bladder 16 deflated to cause the insert 20 to be pulled off of the container 12 which is now formed on the inner surface 24 of the tire 10. The insert 20 can be configured in a variety of manners in accordance with different exemplary embodiments of the process.

FIG. 1 shows a tire 10 with an axis 32 that extends in the axial direction and tread 74 that extends completely 360 degrees around the axis 32 in the circumferential direction of the tire 10. The tire 10 has a pair of sidewalls 26, 28 that are included in a carcass portion of the tire 10 onto which the tread 74 is located. An inner surface 24 of the tire 10 is located opposite the tread 74 and extends between the inner sides of the first sidewall 26 and the second sidewall 28. The container 12 is formed on the inner surface 24 and extends from the inner surface 24 towards the axis 32 in a radial direction of the tire 10 such that the container 24 is located closer to the central axis 32 than the inner surface 24.

Figure 2:
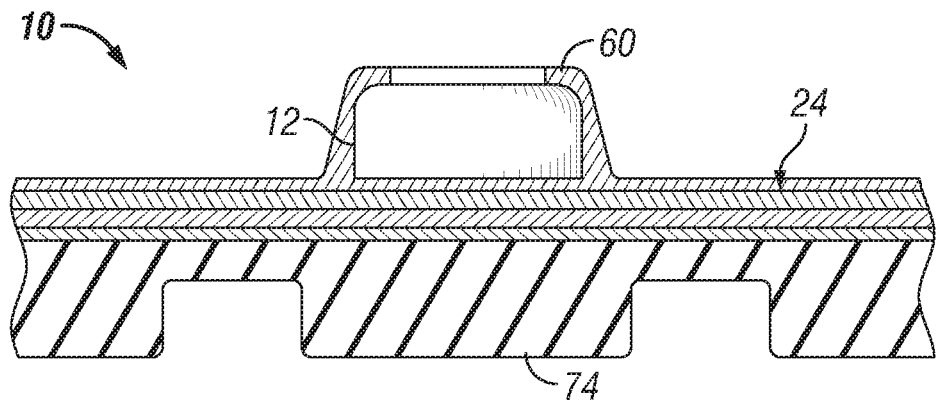
FIG. 2 is a side cross-sectional view of a portion of the tire that includes the container.

A cross-section of the container 12 and a portion of the tire 10 is illustrated with reference to FIG. 2. The tread 74 resides on top of a carcass of the tire 10 that can include a number of layers that may have belts therein. The inner surface 24 of the tire 10 includes the container 12. The container 12 may be made out of the same material as that which makes up the inner surface 24, or could be made out of a different material than the inner surface 24. The container 12 may be thought of as being part of the inner surface 24 or may be thought of as being attached to the inner surface 24. Regardless, the container 12 is integrally formed with the inner surface 24 because the container 12 is formed at the same time the inner surface 24 of the tire 10 is cured in the mold 14 and is not attached subsequent to molding of the tire 10 or inner surface 24. It is to be understood that integral formation of the container 12 includes arrangements where the container 12 is made of a different material than the tire 10 or the inner surface 24 but is attached thereto via the molding process of the tire 10.

The container 12 has an internal void into which a sensor, such as an electronic sensor, could be located. A sidewall of the container 12 extends upwards from the inner surface 24 in the radial direction of the tire 10, over 9 millimeters in some arrangements, and can be of any shape such as circular, oval, or rectangular. In other embodiments, the sidewall of the container 12 extends from 8 to 10 millimeters, from 8 to 13 millimeters, from 12 to 20 millimeters, or greater than 12 millimeters in the radial direction from the inner surface 24. The container 12 has a lip 60 that extends from the sidewall at the portion of the sidewall that is closest to the axis 32 to cover a portion of the cavity of the container 12. An opening into the interior of the container 12 is defined by the lip 60 to allow the sensor to be placed therein. As previously described, the lip 60 could be peeled up to allow insertion of the sensor and then subsequently pushed back into the FIG. 2 position to securely hold the sensor into the container 12. The container 12 may be configured so that only a single, and no more than a single, opening into the interior of the container 12 exists and faces only in the radial direction of the tire 10, and does not face in the axial direction.

The mold 14 for forming the tire 10 includes a bladder 16 that is located within the interior portion of the mold 14 so as to be generally located inside of a mold cavity formed by mold sectors 62, 64, an upper mold half 66, and a lower mold half 68. The various mold 14 pieces 62, 64, 66, 68 may move towards or away from one another in order to open up the mold 14 to allow the mold 14 to close onto the tire 10 and apply pressure to the tire 10. Heating elements can be located within the various segments 62, 64, 66, 68 or they may be otherwise heated in order to transfer heat into the tire 10 that is within the mold 14. Although described as all being movable, it may be the case that some of the segments 62, 64, 66, 68 are not movable while others are in fact movable to open and close the mold 14. The segments 62, 64, 66, 68 may be movable in that they move relative to the ground onto which the mold 14 rests.

Figure 3:
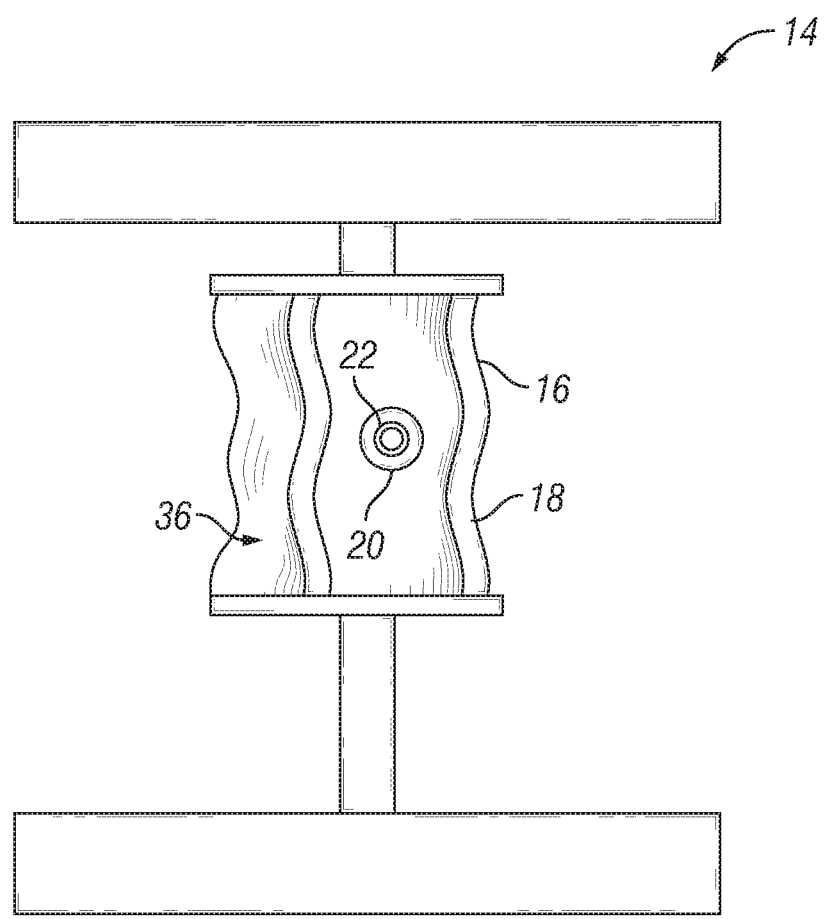
FIG. 3 is a side view of a mold that has a bladder with an insert.

FIG. 3 shows a bladder 16 in accordance with one embodiment. The bladder 16 has a flexible portion 18 that can be made of rubber and has an interior in fluid communication with a supply source or pressure source via a conduit (not shown). The bladder 16 is in the deflated state in FIG. 3 in which fluid 72 is not present within the interior of the flexible portion 18 sufficient to expand the flexible portion 18. The flexible portion 18 has an outer surface 36 at which an insert 20 of the bladder 16 is located. The insert 20 includes a cavity 22 that is visible in FIG. 3 and thus accessible from the exterior of the bladder 16. The insert 20 may be a different material than the flexible portion 18, and can be made of a material that is more rigid than the flexible portion 18. Instead of being two separate pieces, the insert 20 may be integrally formed with the flexible portion 18, for example the insert 20 may be of the same material as the flexible portion 18 but molded into the flexible portion 18 during formation of the flexible portion 18.

Figure 4:
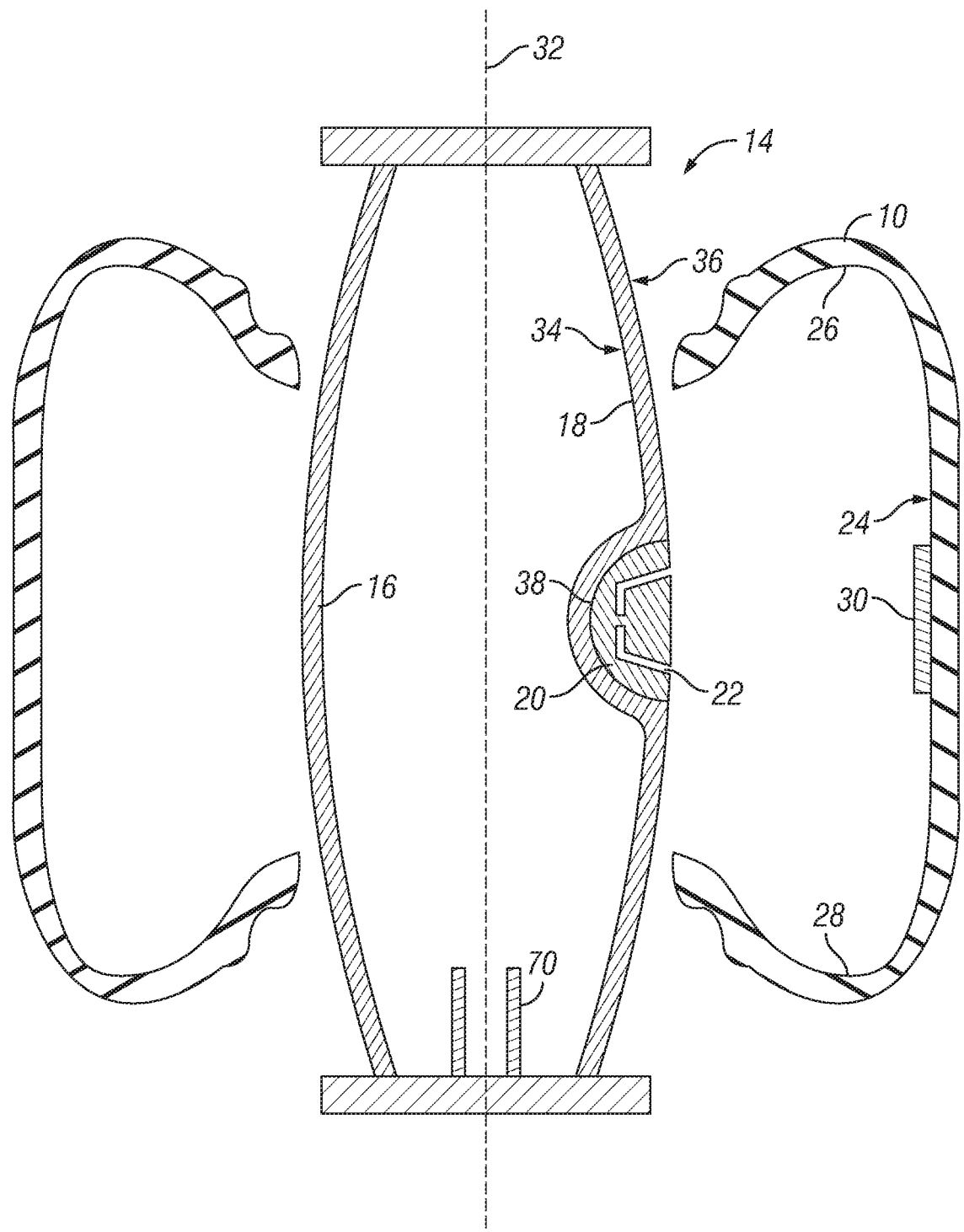
FIG. 4 is a side cross-sectional view of the mold of FIG. 3 with the bladder unactuated.

FIG. 4 shows a step in the process of forming a tire 10 using the bladder 16 of FIG. 3. A green tire 10, which is an uncured tire 10, is located around the bladder 16 so that the bladder 16 is located in the interior of the tire 10. The insert 20 may be made of a single piece and can be made of aluminum or steel. A cavity 38 is present in the outer surface 36 of the flexible portion 18. The cavity 38 can be molded into the flexible portion 18 when the flexible portion 18 is produced. The cavity 38 is defined by the outer surface 36, but does not extend through the flexible portion 18. In this regard, a hole or other aperture does not extend through the flexible portion 18 at the cavity 38. The material of the flexible portion 18 may be continuous above, through, and then below the cavity 38 so that the cavity 38 is formed by a section of the flexible portion 18 integral with the rest of the flexible portion 18. The cavity 38 is seen as a bump on the inner surface 34 of the flexible portion 18. The insert 20 is located inside of the cavity 38 and may be retained therein via adhesives, mechanical fasteners, a lip of the flexible portion 18, a frictional fit, or through any other mechanism of attachment. The exterior of the insert 20 is shown as being flush with the outer surface 36, but could be positioned further in or out in the radial direction.

The container 12 is molded by the insert 20, and material must be available to flow into the insert 20 for this purpose. In this regard, a patch 30 is placed onto the inner surface 24 of the green tire 10. The patch 30 can be a section of uncured cushion gum, or any type of desired uncured rubber and can be applied onto the inner surface 24 in any manner. The patch 30 does not extend 360 degrees around the axis 32 on the inner surface 24, but is limited in location to just the area that the container 12 will be formed. In this regard, the patch 30 does not extend from one sidewall 26 to the other sidewall 28, but is spaced from both of the sidewalls 26, 28 in the axial direction. The patch 30 can be material provided into the green tire 10 for the express purpose of forming the container 12, and not material introduced into the tire 10 for purposes of forming the inner layer of the tire 10, which is generally a layer that inhibits air transfer through the tire 10. However, other embodiments are possible where the patch 30 is an entire inner layer of the tire 10 and thus makes up the inner layer of the tire 10 that is more air impermeable than the rest of the tire 10. This layer may extend all the way from one sidewall 26 to the other sidewall 28. In yet other embodiments, the patch 30 is spaced from the sidewalls 26, 28 in the axial direction, but extends completely 360 degrees about the inner surface 24 about the axis 32. In some instances, the patch 30 is cushion gum that is added to the inner surface 24 which is also made of cushion gum so that the layer making up the inner surface 24 is increased in thickness by 1 or 1.5 times and this extra cushion gum is profiled onto the inner surface 24 so that it does not extend across the entire width of the inner surface 24 from one sidewall 26 to the other sidewall 28.

Figure 5:
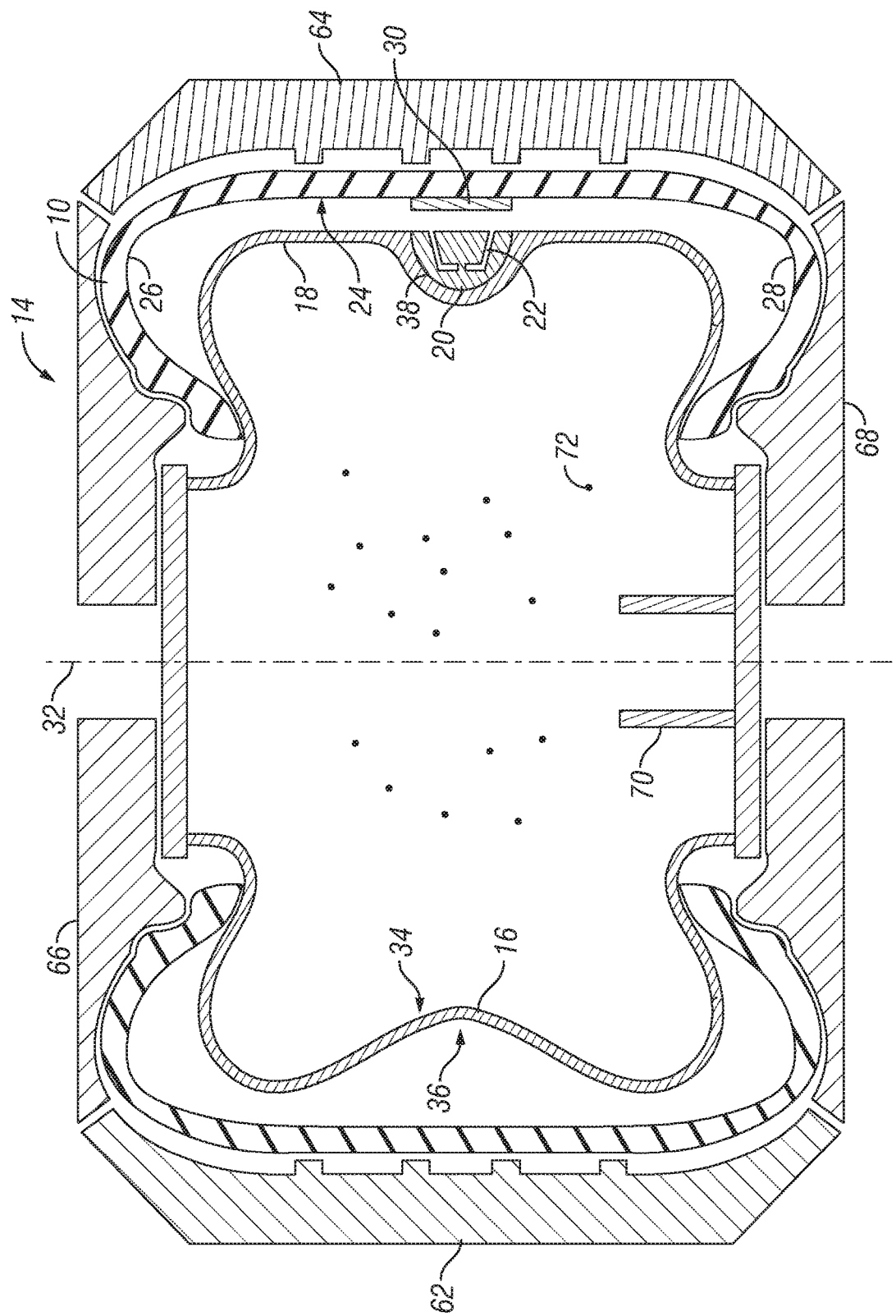
FIG. 5 is a side cross-sectional view of the mold of FIG. 4 with the bladder partially actuated.

FIG. 5 shows the tire 10 of FIG. 4 placed inside of the mold 14 that includes various mold sectors 62, 64 positioned around the tire 10 360 degrees about the axis 32. Although two mold sectors 62, 64 are visible in FIG. 5, additional sectors are present. The sectors 62, 64 include patterns that can be molded into the exterior surface of the tire 10 for use in forming the tread 74. An upper mold half 66 can be moved at the top of the mold 14 to cover the sidewall 26 and may include a pattern that can impart architecture to the exterior of the sidewall 26. In a similar fashion, the mold 14 includes a lower mold half 68 opposite the upper mold half 66 in the axial direction. The lower mold half 68 may impart a design onto the exterior surface of the sidewall 28. With the mold 14 closed so the mold sectors 62, 64 and the mold halves 66, 68 surround the tire 10, fluid 72 can be imparted into the interior of the bladder 16 via an inflation port 70 to cause the bladder 16 to be pressurized. The flexible portion 18 is shown as being expanded from the deflated position in FIG. 4, but is not completely inflated such that the flexible portion 18 does not fully contact the inner surface 24. The insert 20 is aligned with the patch 30 such that inflation of the bladder 16 causes it to approach the patch 30.

The fluid 72 located within the bladder 16 can be any type of fluid such as air, water, steam, or nitrogen. Further, the fluid 72 may be any combination of fluids such as being both water and steam, or some combination of air and nitrogen. The conduit leading to the inflation port 70 and bladder 16 may be located in the same position with respect to the ground, or may move as well relative to the ground when the mold 14 is moved between the closed and open positions. Although shown as having but a single aperture that functions as both an inlet and exit for the fluid 72, the bladder 16 can have two or more openings in other embodiments into which fluid 72 may flow. These openings may be dedicated inlets and outlets, or all of the various openings may function as both inlets and outlets.

Figure 6:
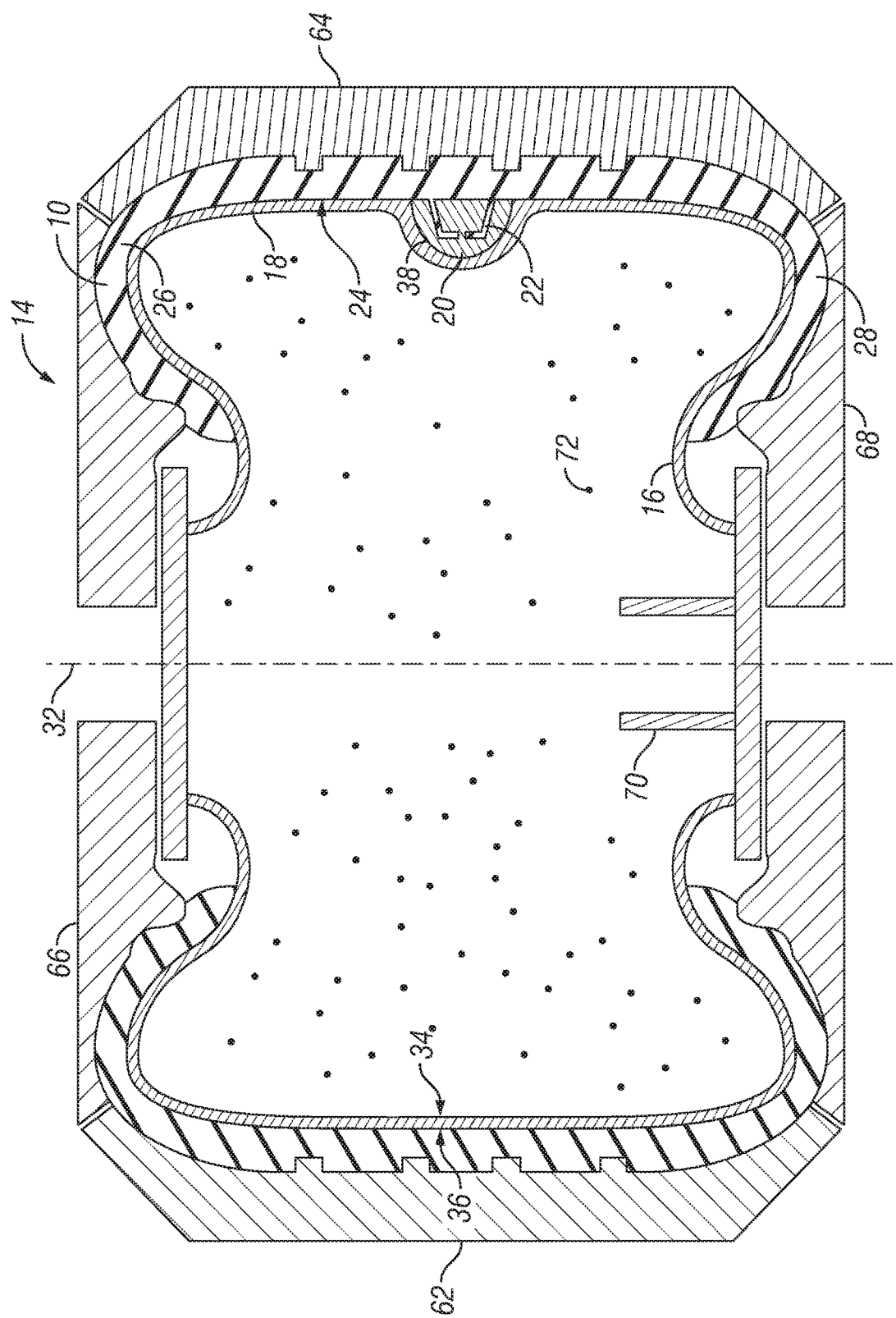
FIG. 6 is a side cross-sectional view of the mold of FIG. 5 with the bladder fully actuated.

FIG. 6 shows the bladder 16 fully inflated via the fluid 72 so that the flexible portion 18 fully engages the inner surface 24. The bladder 16 is pressurized to the point that it presses against the inner walls of the tire 10 that is in the mold 14. The bladder 16 thus forms an interior surface against which the tire 10 is pressed via application of pressure to the exterior of the tire 10 from the segments 62, 64, 66, 68. The bladder 16 may also apply its own pressure to the interior of the tire 10 to cause the tire 10 to be compressed between all of the elements 62, 64, 66, 68. The mold 14 may be heated to also cause curing of the tire 10 and the material in the cavity 22. Heating elements within the various mold elements 62, 64, 66, 68 or other portions of the mold 14 may be used to transfer heat into the tire 10 and container 12. Pressure applied by the mold components 62, 64, 66, 68 and by the bladder 16 causes pressure to be applied to the green tire 10 to impart the tread 74 and other architectural features into the tire 10 and to cause, with heat and time, curing of the tire 10. Additionally, the insert 20 is pressed against the patch 30 and the material of the patch 30 flows into the cavity 22 that is defined in the insert 20. The cavity 22 is shaped and sized so that this material will be molded into a container 12 of an accordingly desired shape and size. All of the material of the patch 30 can flow into the cavity 22, or some of the patch 30 material can flow into the cavity 22 while other material of the patch 30 remains on the inner surface 24 and does not flow into the cavity 22 to form the container 12. In some instances, at least 60 bar of pressure can be applied against the tire 10 so that material flows into the cavity 22. However, in other embodiments less than 60 bar of pressure is applied to the tire 10 to cause material to flow into the cavity 22 to form the container 12.

Figure 7:
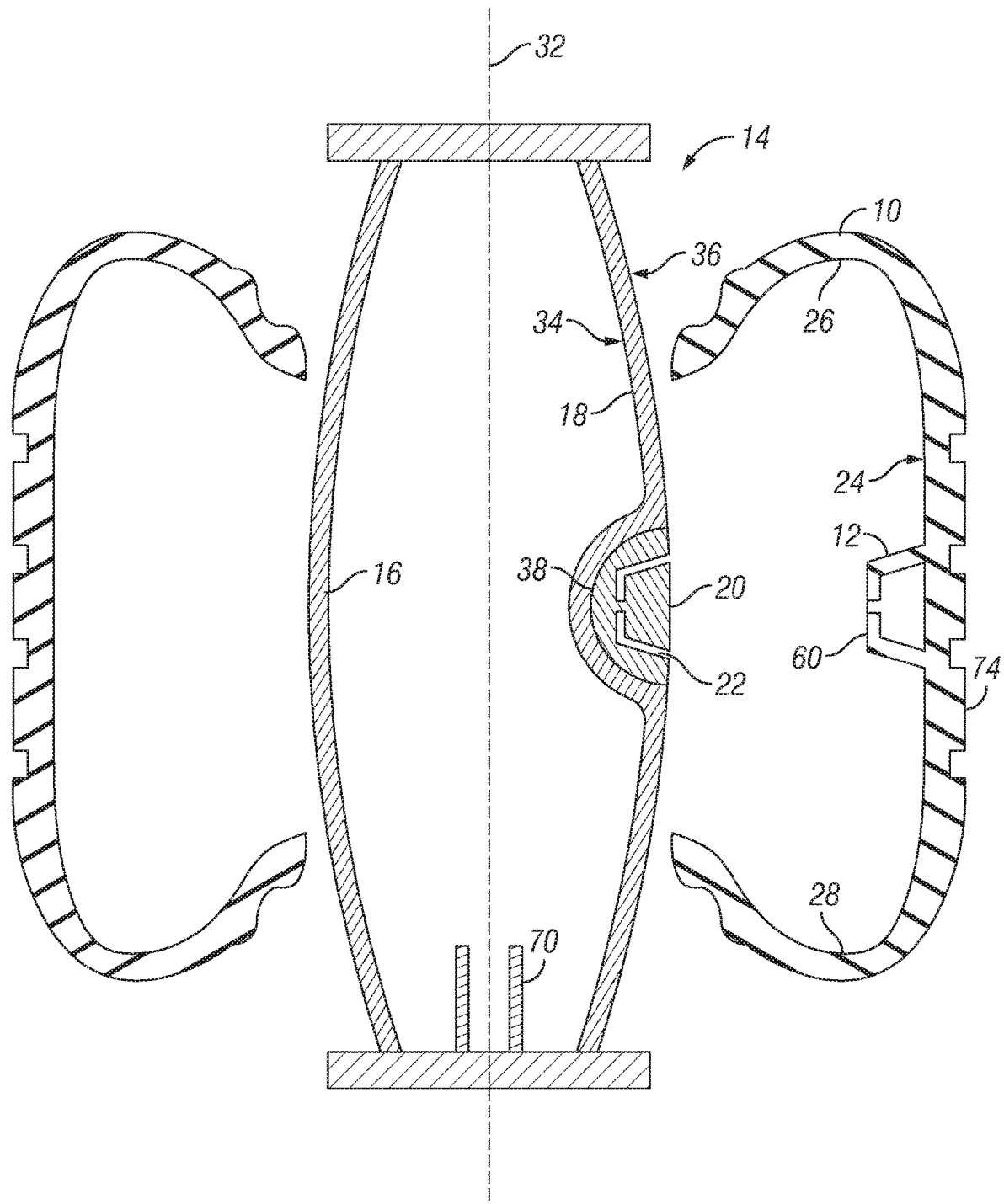
FIG. 7 is a side cross-sectional view of the mold of FIG. 6 with the bladder deflated and disengaged from the interior of the tire and the newly formed container.
Figure 8:
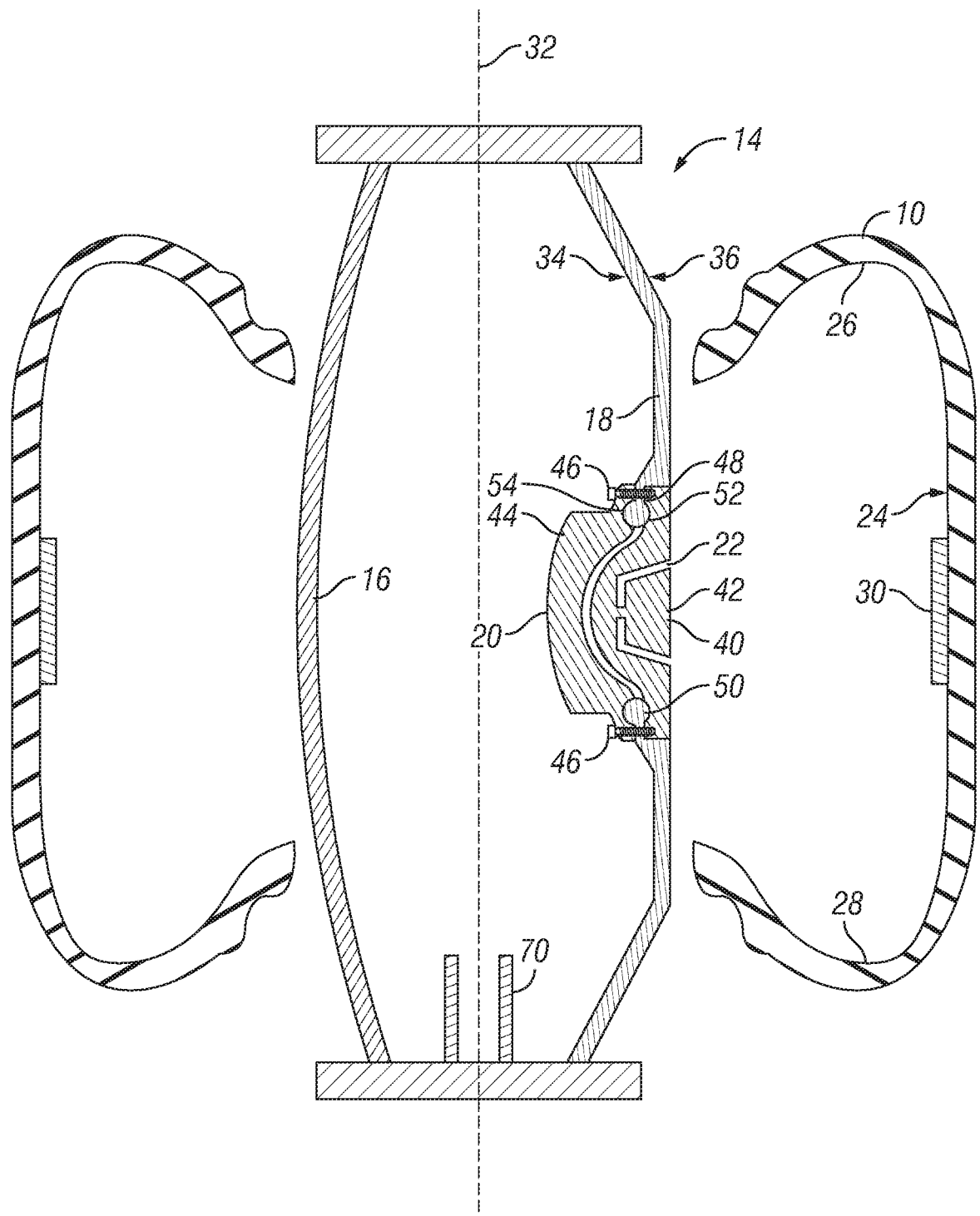
FIG. 8 is a side cross-sectional view of a mold with a bladder having an insert in accordance with another exemplary embodiment.
Figure 9:
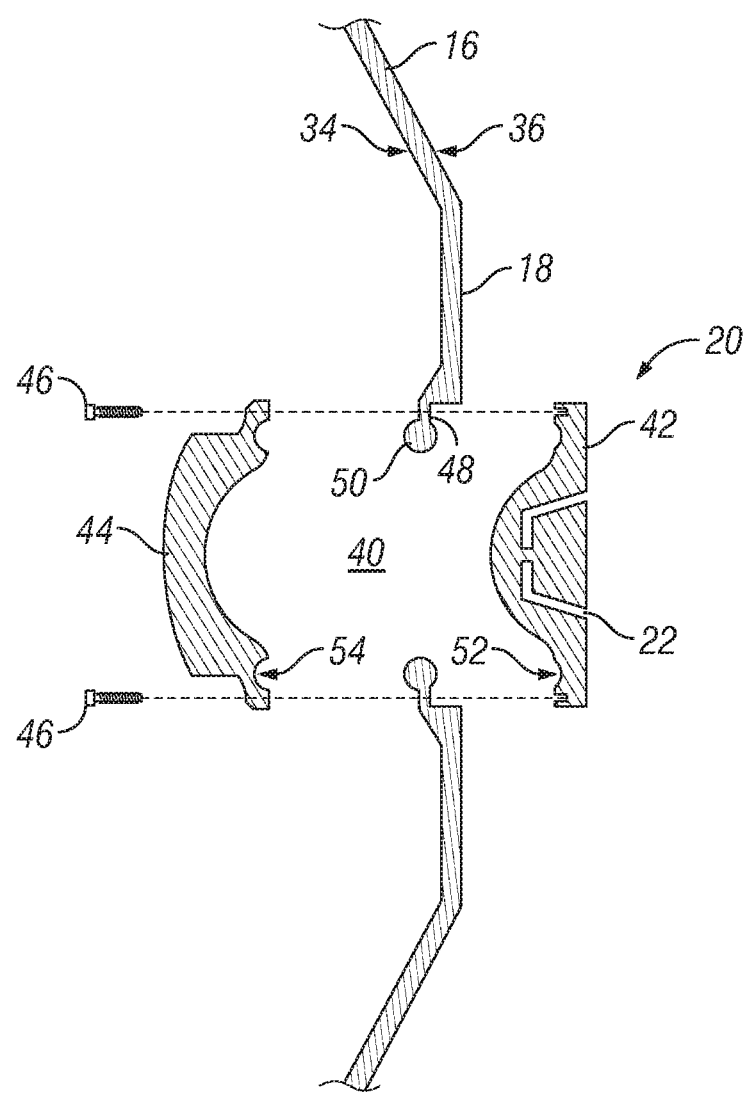
FIG. 9 is a side cross-sectional view of a portion of the bladder that includes the insert in which the insert is disassembled.
Figure 10:
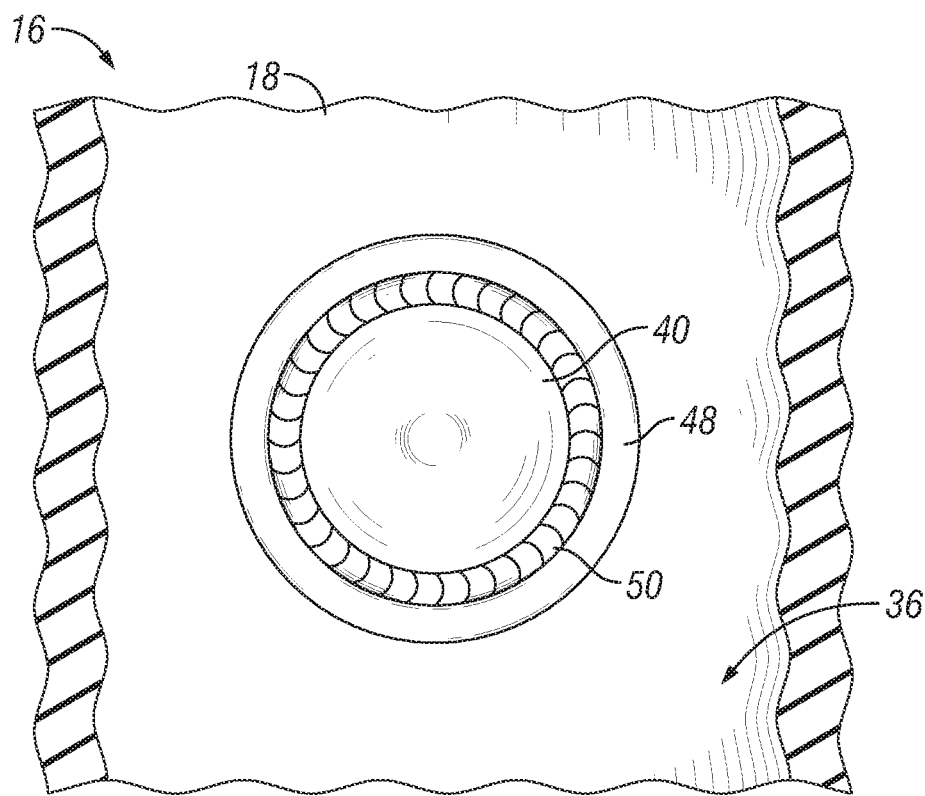
FIG. 10 is a front view of a portion of the bladder that shows the opening into the bladder with the insert of the bladder not present.
Figure 11:
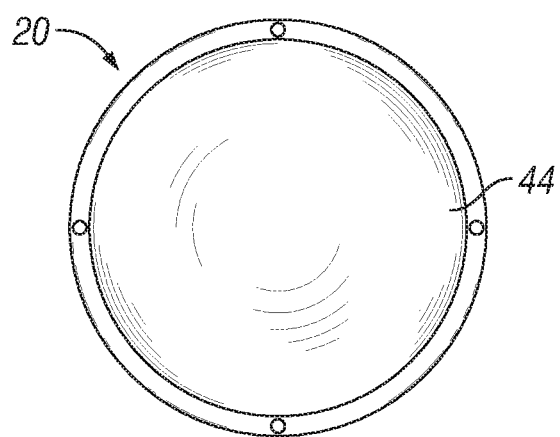
FIG. 11 is a back view of the insert of FIG. 8 without the mechanical fasteners present.

After a sufficient amount of time, the pressure in the bladder 16 can be released by venting or otherwise removing some or all of the fluid 72 from the interior of the bladder 16 so that the flexible portion 18 disengages the inner surface 24 and removes pressure on the tire 10. FIG. 7 shows the bladder 16 deflated such that the flexible portion 18 does not engage the tire 10, and so that upon retraction the insert 20 is pulled from engagement with the tire 10 leaving the molded container 12 onto the inner surface 24. The lip 60 may resist demolding since it is formed within a corresponding lip within the cavity 22. However, the lip 60 is flexible enough that it will be pulled from within the cavity 22 upon deflation of the bladder 16. The container 12 will remain on the inner surface 24 and can thus be integrally molded with the rest of the tire 10 during the molding of the tire 10. The tire 10, with the included container 12, may be completely cured upon the deflation of the bladder 16, or curing of these warm items 10, 12 may continue for some time after the bladder 16 is deflated and the other mold components 62, 64, 66, 68 opened and the tire 10 and attached container 12 removed from the mold 14.

A variation of the process of forming the container 12 is shown with reference to FIGS. 8-11. This process is similar to that previously described and a complete repeat of the same information is not needed. The process is different in that the patch 30 is a layer of material that extends 360 degrees around the inner surface 24, instead of just being a section of material sufficient for forming the container 12. The patch 30 is spaced from the sidewalls 26, 28 in the axial direction and is not in contact with the sidewalls 26, 28. It may be easier in manufacturing to apply the patch 30 as a layer completely around the tire 10 instead of just at a distinct location that does not go completely around. The insert 20 differs from that previously described in that it is not a single molded piece, but is instead made of a first piece 42 and a second piece 44. The cavity 22 is formed into the first piece 42 and directly faces the patch 30 during the molding of the container 12 and tire 10. The first piece 42 engages the patch 30 and potentially the inner surface 24 during the molding process. The insert 20 also includes a second piece 44 that is located on the inside of the bladder 16 and that does not engage the patch 30 or the inner surface 24 during molding. The second piece 44 has a convex back surface and a concave front surface that faces a correspondingly convex back surface of the first piece 42. Although shown as being made of two pieces 42, 44, additional number of pieces can be included in the insert 20 in accordance with other exemplary embodiments.

The flexible portion 18 has an opening 40 that extends completely through the flexible portion 18. The flexible portion 18 has a step 48 on its outer surface 36 that defines a portion of but not all of the opening 40. The step 48 is circular and the defined opening 40 is likewise generally circular. The flexible portion 18 also has a section 50 adjacent the step 48 that along with the step 48 defines the opening 40 so that the opening is defined by these two features 48, 50. The section 50 has a circular cross-sectional shape with a stem portion that holds the circular cross-sectional shape onto a thicker portion of the flexible portion 18. These features in the flexible bladder 16 can be formed via molding into the flexible bladder 16 during its formation. The first piece 42 includes a concave shaped surface 52 that extends completely around the first piece 42. The second piece 44 includes its own concave shaped surface 54 that likewise extends completely around the second piece 44. The concave shaped surfaces 52, 54 are sized and shaped to be complimentary to the convex shaped section 50, although they need not be exact fits since the convex shaped section 50 can be flexible and somewhat compressible. The first and second pieces 42, 44 may be made of aluminum or steel or any other suitable metal, and the flexible portion 18 can be made of rubber.

The opening 40 can be filled by the insert 20 and in doing so the insert 20 can be carried by the flexible portion 18. The insert 20 can be assembled by positioning the first piece 42 on the outer surface 36 so that it is positioned within the opening 40 such that it is within the step 48 and the concave shaped surface 52 engages the section 50. The second piece 44 is located inside of the bladder 16 and is positioned against the inner surface 34 so that the concave shaped surface 54 engages the section 50. Mechanical fasteners 46, which may be bolts in some embodiments, are used to effect attachment of the first and second pieces 42, 44 to the flexible portion 18. Any number of mechanical fasteners 46 can be employed although four mechanical fasteners 46 are used in the embodiment illustrated in FIGS. 8-11. In other embodiments, from 2 to 6, from 2 to 8, 1, or up to 12 mechanical fasteners 46 may be used to effect attachment of the insert 20 to the flexible portion 18.

The insert 20 may be arranged so that the first and second pieces 42, 44 are drawn towards one another via the tightening of the mechanical fasteners 46. Doing so causes the second 50 to be compressed to help seal the interior of the bladder 16 to retain fluid 72 therein. The first piece 42 and second piece 44 are shown as being disengaged from one another and not contacting one another, although they may touch one another in other embodiments. Operation of the bladder 16 in the mold 14 can be the same as that previously discussed in that actuation of the bladder 16 causes the cavity 22 to have material of the patch 30 flow therein for formation of the container 12. The cavity 22 can be formed completely within the first piece 42 so that no part of the cavity 22 is defined by the second piece 44.

Figure 12:
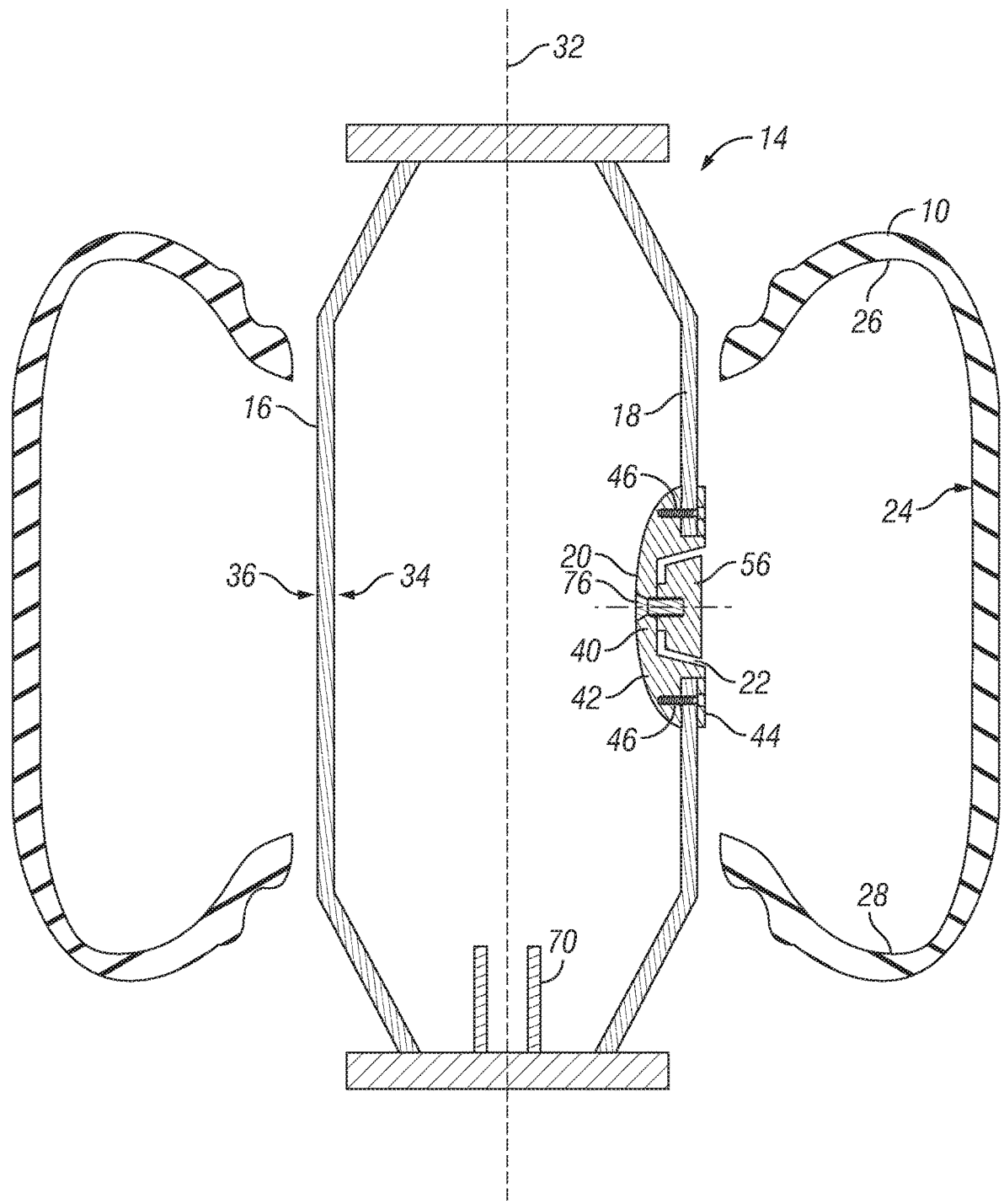
FIG. 12 is a cross-sectional view of a mold with a bladder having an insert in yet another exemplary embodiment.
Figure 13:
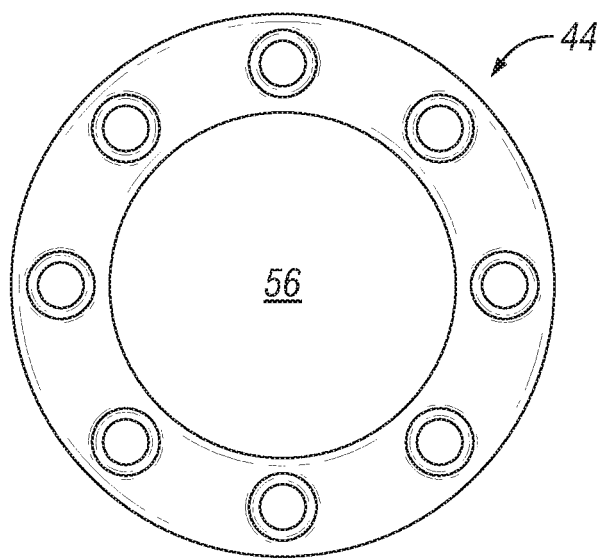
FIG. 13 is a front view of a second piece of the insert of FIG. 12.

Another arrangement of the flexible portion 18 and the insert 20 of the bladder 16 is illustrated with reference to FIGS. 12 and 13. An opening 40 is again present in the flexible portion 18, but this opening 40 is just a circular punch through the flexible portion 18 and lacks the aforementioned step 48 and section 50. The opening 40 is simply a round hole of a consistent cross-sectional shape that extends completely through the flexible portion 18. The first piece 42 again defines the cavity 22 but instead of being a single, cast piece the first piece 42 is made of two different parts that are attached to one another via a fastener 76. These two attached parts of the first piece 42 together define the cavity 22. It may be more economical or otherwise more practical to form the first piece 42 out of two or more parts instead of just one. In accordance with other embodiments, any number of parts may be used to construct the first piece 42. The first piece 42 is positioned within the bladder 16 so that the first piece 42 engages the inner surface 34. The first piece 42 fills up the opening 40 and may extend beyond the outer surface 36 but does not contact the outer surface 36 in some embodiments.

The second piece 44 is a plate with a circular shaped opening 56 that extends completely through the second piece 44. The second piece 44 is a circular shaped plate but could be rectangular in shape or variously shaped in other embodiments. The second piece 44 is made of a single part and is positioned against the outer surface 36 and is not positioned inside of the opening 40. The second piece 44 may engage, along its interior surface that defines the circular shaped opening 56, the first piece 42. In other embodiments, the first and second pieces 42 and 44 are not in contact with one another. The axis of the circular shaped opening 56 is coaxial with the axis of the opening 40. Additionally, this axis extends through the center of the first piece 42 and will extend through the center of the container 12 that is molded by the insert 20. Eight mechanical fasteners 46, which are bolts, extend through the second piece 44 and in turn through the flexible bladder 16 and then into the first piece 42. The eight mechanical fasteners 46 can be tightened to secure the first and second piece 42, 44 to the flexible portion 18. The flexible portion 18 could be at least partially compressed between the pieces 42, 44 and a seal of fluid 72 may be formed at the location of attachment of the insert 20 to the flexible portion 18. Although the mechanical fasteners 46 are shown as extending first through the second piece 44, then through the flexible portion 18, and then next into the first piece 42, in other arrangements this order can be reversed so that the mechanical fasteners 46 first extend through the first piece 42 and subsequently into the second piece 44.

Operation of the mold 14 can be done in a similar manner as that previously discussed. However, in this embodiment the patch 30 is not present. Instead, the material to be placed inside of the cavity 22 comes from the inner surface 24 and there should be sufficient material making up the inner surface 24 to allow some to flow into the cavity 22 when the insert 20 is urged against the inner surface 24 during the molding process. In this regard, a patch 30 does not need to be independently placed onto the inner surface 24 should the inner surface 24 be made of a sufficient thickness in the radial direction that allows for flow into the cavity 22.

Figure 14:
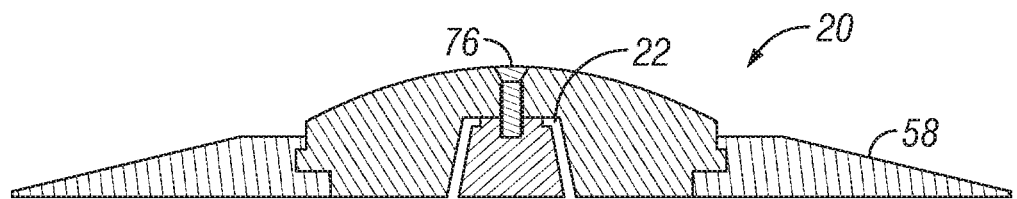
FIG. 14 is a side cross-sectional view of an insert and a nylon skirt that can be used in accordance with yet another embodiment.
Figure 15:
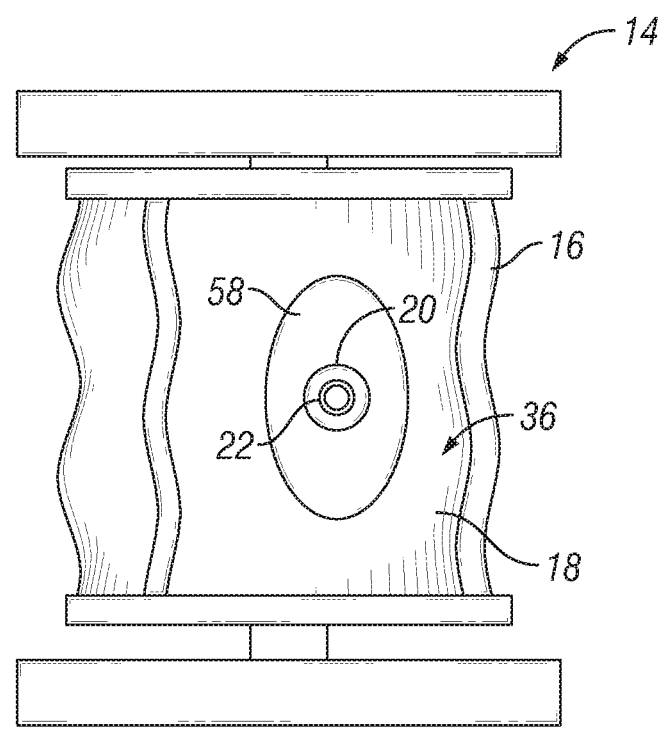
FIG. 15 is a front view of a mold that has a bladder that includes the insert and nylon skirt of FIG. 14.

Another exemplary embodiment of the mold 14 is shown with reference to FIGS. 14 and 15. The insert 20 includes two parts that can be made out of metal that are attached to one another via a fastener 76 such that the two parts define together the cavity 22. One of the parts of the insert 20 has a pair of steps that receive a nylon skirt 58 and the nylon skirt 58 is attached to the part of the insert 20 that defines the two pairs of steps. The insert 20 is thus made out of both metal, such as steel or aluminum, and nylon. The nylon skirt 58 surrounds the metal portion of the insert 20 360 degrees, and can be attached to the metal portion in any manner such as by welding, adhesives, a press fit engagement, or mechanical fasteners. The insert 20 is attached to the flexible portion 18 such that the nylon skirt 58 engages the flexible portion 18 and the metal section of the insert 20 that defines the cavity 22 does not engage the flexible portion 18. The nylon skirt 58 can be attached to the flexible portion 18 in any manner, such as by adhesion, mechanical fasteners, crimping, or sonic welding. The nylon skirt 58 can be 3D printed. During use of the bladder 16, inflation causes the nylon skirt 58 and the metal portion that defines the cavity 22 to come into contact with the inner surface 24 of the tire 10 so that material from the inner surface 24 or patch 30 flows into the cavity 22 to form the container 12. Deflation of the bladder 16 causes the container 12 to be removed from the cavity 22 as previously discussed so that the container 12 is integrally formed with the tire 10.

The insert 20 can be a piece that is made of a different material than the flexible portion 18 and may be attached to the flexible portion 18 in a variety of manners such as welding, mechanical fasteners, crimping, sonic welding, adhesives, or through an interlocked arrangement in which the insert 20 is within a pocket of the flexible portion 18. In some instances, the flexible portion 18 can be molded in a specific way to accommodate the insert 20 and facilitate attachment of the insert 20. In some instances, the flexible portion 18 has an opening 40, but in other arrangements the opening 40 is not required.

Figure 16:
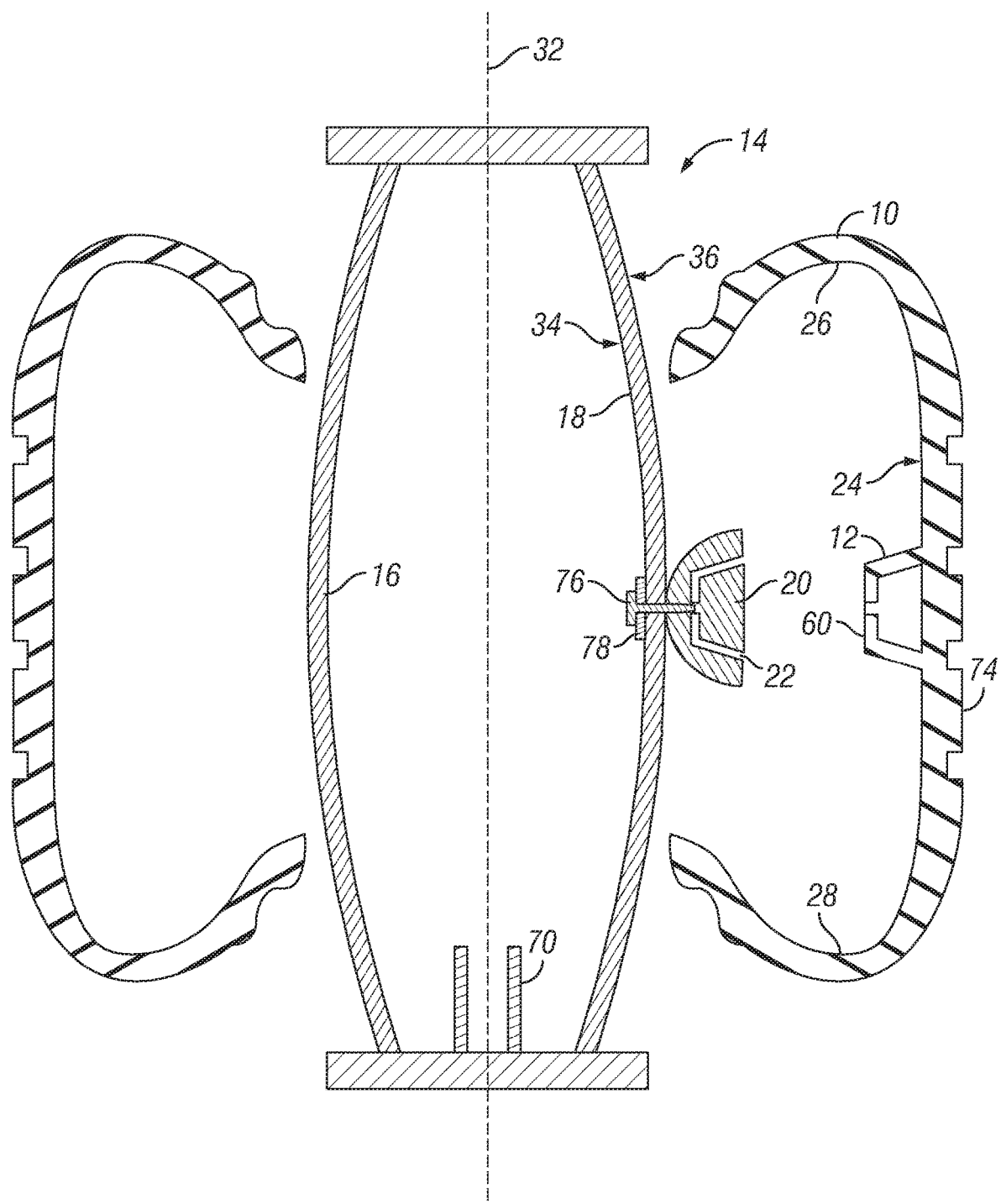
FIG. 16 is a side cross-sectional view of a mold with an insert in accordance with another exemplary embodiment.

Yet another arrangement of the mold 14 is shown with reference to FIG. 16 in which the insert 20 is located primarily on the outside of the bladder 16 and has a shape similar to those previously discussed with a cavity 22 into which material may flow for the formation of the container 12. The insert 20 may be one piece or may be made of two pieces held together via the fastener 76. The insert 20 is retained to the outside of the bladder 16 by way of a fastener 76 that extends through the bladder 16 and into the insert 20. A plate 78 is positioned on the inside of the bladder 16 and engages the inner wall of the bladder and distributes force among a larger area so that the fastener 76 does not act to tear or damage the wall of the flexible portion 18. The fastener 76 extends through the plate 78, through the flexible portion 18, and into the insert 20.

The described process allows for the container 12 to be built into the tire 10 using a conventional tire building process in which a solid core is not needed. The pressure of the fluid 72 within the bladder 16 may be at 16 bar in some embodiments, and the tire 10 when going into the mold 14 can be a cold green tire 10. In other embodiments, from 10 to 20 bar of pressure may be applied within the bladder 16 during the curing process when the bladder 16 is forced against the tire 10. The container 12 is formed without having to place a mold onto the tire 10, but instead having the mold/insert 20 placed onto the flexible portion 18 of the bladder 16. The surface that the container 12 is formed on is the inner surface 24 that is below the tread 74, and the container 12 is not formed on either one of the sidewalls 26 or 28.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed is:

1. A method of molding a tire that has a container, comprising:
   placing an uncured tire into a mold;
   providing a bladder that has a flexible portion and that has an insert, wherein the insert has a cavity configured for molding the container into the tire, wherein the container has a side wall and a lip and a container cavity wherein the lip covers a portion of the cavity, wherein the insert extends less than 360 degrees about a circumference of the flexible portion and extends less than an entire axial length of the flexible portion, wherein the insert engages the flexible portion;
   inflating the bladder within the mold, wherein the bladder has a fluid within the bladder that engages the flexible portion when inflated, and wherein the insert engages the uncured tire when inflated, wherein material of the uncured tire flows into the cavity of the insert;
   applying sufficient heat and pressure to the uncured tire to at least partially cure the tire when the uncured tire is in the mold, wherein the material in the insert forms the container such that the container is integrally formed with other portions of the tire; and
   opening the mold;
   placing a sensor into the container cavity such that the lip is disposed radially inward from the entire sensor and holds the sensor in the container cavity.

2. The method as set forth in claim 1, wherein inflating the bladder causes the insert to move toward and become engaged with an inner surface of the uncured tire and to be pressed against the inner surface of the uncured tire.

3. The method as set forth in claim 1, further comprising deflating the bladder such that the deflation causes the insert to be disengaged from the container.

4. The method as set forth in claim 1, wherein the uncured tire on an inner surface of the uncured tire between two sidewalls of the uncured tire has a patch of cushion gum that is the material that flows into the cavity of the insert to form the container, wherein the patch of cushion gum does not extend 360 degrees around an axis of the uncured tire.

5. The method as set forth in claim 1, wherein the uncured tire on an inner surface of the uncured tire between two sidewalls of the uncured tire has a layer of cushion gum that is the material that flows into the cavity of the insert to form the container, wherein the layer of cushion gum extends 360 degrees around an axis of the uncured tire and is spaced from and not in contact with the two sidewalls in an axial direction.

6. The method as set forth in claim 1, wherein the flexible portion of the bladder is made of rubber, and wherein the insert is made of aluminum.

7. The method as set forth in claim 1, wherein the flexible portion has an outer surface into which a cavity is defined, wherein the insert is located in the cavity of the flexible portion, and wherein the insert does not extend through the flexible portion to an inner surface of the flexible portion.

8. The method as set forth in claim 1, wherein the insert has a convex surface that faces away from the container during applying sufficient heat and pressure to the uncured tire.

9. A method of molding a tire that has a container, comprising:
   placing an uncured tire into a mold;
   providing a bladder that has a flexible portion and that has an insert, wherein the insert has a cavity configured for molding the container into the tire;

inflating the bladder within the mold, wherein the bladder has a fluid within the bladder, wherein material of the uncured tire flows into the cavity of the insert;

applying sufficient heat and pressure to the uncured tire to at least partially cure the tire when the uncured tire is in the mold, wherein the material in the insert forms the container such that the container is integrally formed with other portions of the tire; and opening the mold;

wherein the flexible portion has an outer surface and an oppositely disposed inner surface, wherein an opening extends through the flexible portion, wherein the insert has a first piece and a second piece, wherein the cavity of the insert is defined in the first piece, wherein the insert is located in the opening.

10. The method as set forth in claim 9, wherein mechanical fasteners that are bolts connect the first piece to the second piece and extend through the flexible portion, wherein the flexible portion has a step and wherein the first piece is disposed within the step and wherein the second piece is not disposed within the step.

11. The method as set forth in claim 10, wherein the flexible portion has a section that has a circular cross-sectional shape that defines a portion of the opening, wherein the first piece and the second piece each have concave shaped surfaces that engage the circular cross-sectional shape section of the flexible portion.

12. The method as set forth in claim 9, wherein the first piece is located in the opening, wherein the second piece is not located in the opening and engages the outer surface of the flexible portion, wherein mechanical fasteners connect the first piece to the second piece and extend through the flexible portion.

13. The method as set forth in claim 12, wherein the opening has a circular shaped cross-section that is not stepped, wherein the second piece is a plate that has a circular shaped opening that is coaxial with the opening of the flexible portion, and wherein the mechanical fasteners are bolts that extend through the flexible portion and engage both the first piece and the second piece.

14. A method of molding a tire that has a container, comprising:

placing an uncured tire into a mold;

providing a bladder that has a flexible portion and that has an insert, wherein the insert has a cavity configured for molding the container into the tire;

inflating the bladder within the mold, wherein the bladder has a fluid within the bladder, wherein material of the uncured tire flows into the cavity of the insert;

applying sufficient heat and pressure to the uncured tire to at least partially cure the tire when the uncured tire is in the mold, wherein the material in the insert forms the container such that the container is integrally formed with other portions of the tire; and opening the mold;

wherein the bladder has a nylon skirt that engages the insert and that engages the flexible portion such that the insert is not in contact with the flexible portion.

* * * * *